May 7, 1929. W. H. SCHMITT 1,711,749
KETTLE COVER
Filed Feb. 16, 1928

INVENTOR:
William H. Schmitt
BY David E. Carlsen
ATTORNEY.

Patented May 7, 1929.

1,711,749

UNITED STATES PATENT OFFICE.

WILLIAM H. SCHMITT, OF ST. PAUL, MINNESOTA.

KETTLE COVER.

Application filed February 16, 1928. Serial No. 254,882.

My invention relates to lid devices for cooking utensils and any other containers having a perimetrally beaded opening. The main object is to provide new and useful means attached to and associated with a lid of said kind and adapted to be used with containers of various kinds, with or without handles or bails. A further object is to provide important improvements over the device presented in my United States patent application Serial No. 235,516 filed November 25th, 1927. Other objects and advantages of my device will be fully disclosed in the following specification reference being had to the accompanying drawings in which,—

Figure 1:
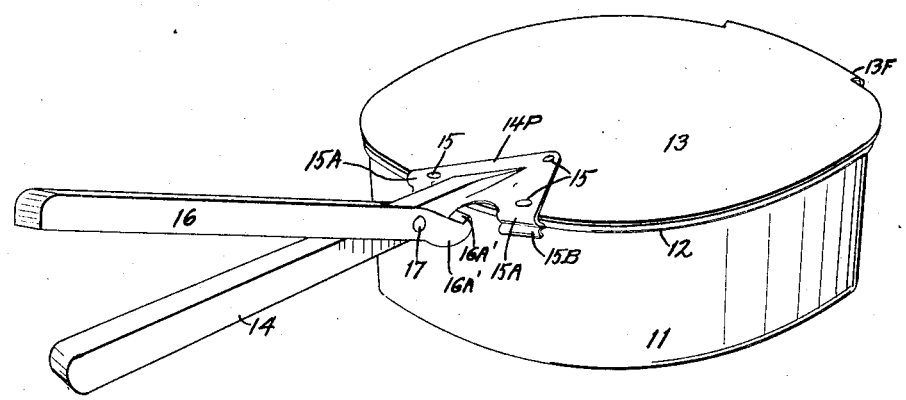
Fig. 1 is a perspective view of a stew pan and a lid thereon embodying a preferred form of this invention.

Referring to the drawing by reference numerals 11 designates any type of container such as a stew pan, kettle or similar vessel having an outwardly beaded opening, said bead designated as 12. 13 is a sheet metal cover for such container and adapted to lie on the bead or in a perimetral ledge (not shown) just within the bead 12.

Figure 2:
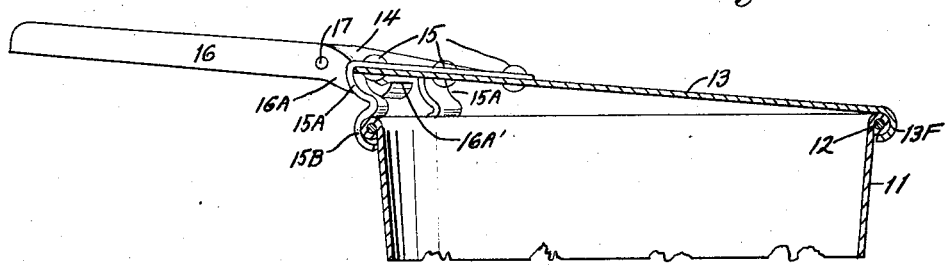
Fig. 2 is a longitudinal approximately diametrical section of Fig. 1 taken on a vertical plane alongside of the cover and handle and thence diametrically ahead of said handle through the pan and cover.
Figure 3:
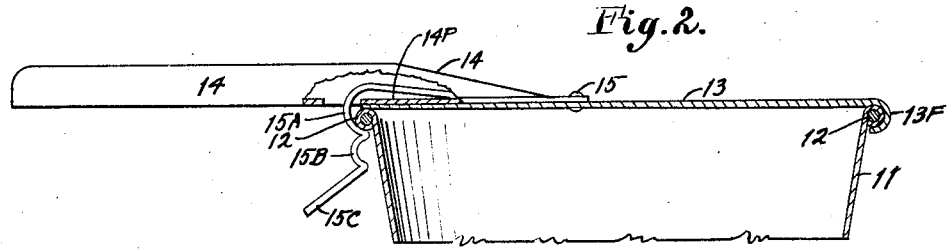
Fig. 3 is a modification of Fig. 2.
Figure 4:
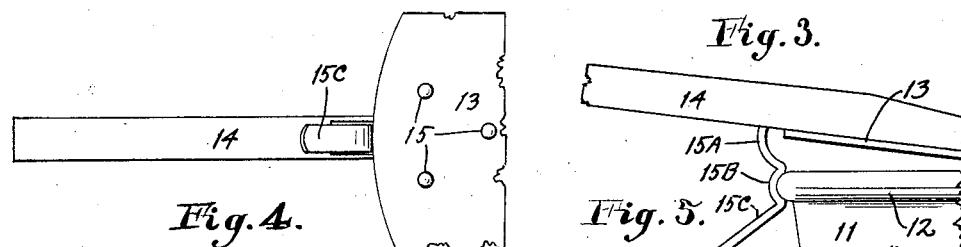
Fig. 4 is a bottom view of Fig. 3, omitting all of the stew pan and showing only a portion of the cover to which the handle is attached.
Figure 5:
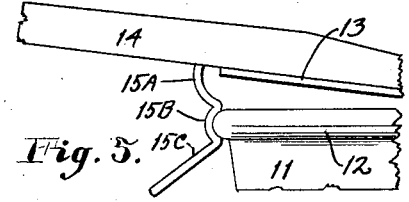
Fig. 5 is an enlarged elevation of the central part of Fig. 2 showing my improved device in operative position holding one side of the pan cover elevated above the pan.

In the forms of my device illustrated in Figs. 1–5 inclusive 14 designates a cover handle suitably fixed on top of the cover as with rivets 15 through a plate 14$^P$ formed integral with the said handle said plate having a number of bead engaging lugs comprising each a tongue 15$^A$ bent down at the edge of the cover and curved inwardly toward the center of the cover as shown and said curved part adapted to frictionally engage the bead 12 when the cover is down flat on the container. Below said inwardly arched part of the tongue it is further bent in the form of a similar and lower arch 15$^B$ for a purpose to be described. Diametrically opposite the parts just described I provide the cover with a preferably integrally formed arcuate and downwardly thence inwardly curved flange 13$^F$ adapted to also engage the bead 12. In placing the cover on the container the said flange 13$^F$ is simply engaged with the bead holding the cover at an upward incline from said part at which time the lower end of the tongue members 15$^A$—15$^B$ will be just above the diametrically opposite bead part and this side of the cover can be pressed down and said arched tongues forcibly pushed down upon the bead arch 15$^B$ being sprung over said bead and down until the arch or arches 15$^A$ engages it and the cover is then in closing position and thus held rigid and concentric on the container. In Figs. 3, 4 and 5 there is but one tongue member 15$^A$—15$^B$ comprising a spring metal leaf fixed longitudinally on plate 14$^P$ under the handle and is further provided with an integral outwardly directed finger catch 15$^C$ from the lower part of arch. This finger catch may be engaged by a finger of the operator's hand which grasps the handle 14 for the purpose of pulling said catch 15$^C$ outwardly to release either arch member 15$^A$ or 15$^B$ from engagement with bead 12.

In Figs. 1 and 2, 16 is an auxiliary hollow handle straddling handle 14 and pivoted to it as at 17, having a short lever arm 16$^A$ forward of the pivot and terminating in an upwardly directed transverse ledge 16$^{A'}$ adapted to engage the under side of bead 12 to thus securely engage the container when the operator grasps over both handles 14—16 and presses them toward each other. Thus with a stew pan or the like engaged by flange 13$^F$ and parts 15$^A$—$^B$ and 16$^{A'}$ simultaneously, the operator can lift or move the pan and contents as he may see fit. If the contents of the pan are all or partly liquid requiring considerable cooking it may be desirable to let out steam generated under the cover. For this purpose the operator simply raises the handle side of the cover until the lower arch 15$^B$ of the tongue members adjacent the handle engage the bead 12, as shown in Fig. 2, thus holding the said part of the cover elevated for escape of steam whereas the opposite flange member 13$^F$ of the cover continues to hold that part of the cover in place.

It will now be readily understood that I have provided a utensil cover with means for engaging the opening bead of such utensil at a number of places simultaneously, said means embodied in the cover itself and in the handle attached thereto. These means further provide for raising and holding the cover in angular position. It is further obvious that the device is particularly useful on containers having no radially extending fixed handles and the device is applicable to kettles, pans etc. of well known standard types.

I claim:—

1. A cover for containers having an outwardly beaded perimetral opening, said cover comprising a sheet metal plate with an arcuate front flange directed downwardly and thence inwardly to engage the adjacent bead of the container, means on said cover at its perimeter and opposite said flange for yieldingly engaging the said bead selectively with the cover in predetermined raised position or in contact with the container simultaneously as said flange engages the bead a handle fixed on said cover adjacent said latter yieldable means and auxiliary means associated with said handle to positively engage the bead at a point diametrically opposite the said flanged part of the cover.

2. A cover for containers having an outwardly beaded perimetral opening, said cover comprising a sheet metal plate with an arcuate front flange directed downwardly and thence inwardly to engage the head of the container, means on said cover at its perimeter and opposite said flange for yieldingly engaging the said bead selectively with the cover in predetermined raised position or in contact with the container simultaneously as said flange engages the bead, a handle fixed on said cover adjacent said latter yieldable means and auxiliary means associated with said handle to positively engage the bead at a point diametrically opposite the said flanged part of the cover, said yieldable bead engaging means comprising a number of metal lips projecting downwardly from the perimeter of the cover each formed with a number of adjacent horizontal inwardly opening grooves adapted to selectively engage the bead and press inward to hold the cover in place as set forth.

3. The structure specified in claim 1 in which said yieldable bead engaging means comprises a number of metal lips projecting downwardly from the perimeter of the cover each formed with a number of adjacent horizontal inwardly opening grooves adapted to selectively engage and press inwardly on the bead of the container and an outwardly directed integral portion projecting from the lower part of the lip for a finger hold as described.

4. The structure specified in claim 1 in which said auxiliary handle means comprises a vertically oscillatable handle pivotally secured to the fixed handle outwardly of the cover, a jaw member comprising the front end of said latter handle forward of its pivot and the front end of said jaw arranged to contact with the under part of the bead of the container when the two handles are pressed toward each other.

In testimony whereof I affix my signature.

WILLIAM H. SCHMITT.